(12) United States Patent
Ogihara

(10) Patent No.: US 11,675,626 B2
(45) Date of Patent: Jun. 13, 2023

(54) CONTAINER IMAGE ARRANGEMENT METHOD AND NON-TRANSITORY COMPUTER-READABLE MEDIUM

(71) Applicant: FUJITSU LIMITED, Kawasaki (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 269 days.

(21) Appl. No.: 17/150,736

(22) Filed: Jan. 15, 2021

(65) Prior Publication Data

US 2021/0294652 A1    Sep. 23, 2021

(30) Foreign Application Priority Data

Mar. 23, 2020 (JP) .............................. JP2020-051290

(51) Int. Cl.
*G06F 9/455* (2018.01)
*G06F 9/50* (2006.01)

(52) U.S. Cl.
CPC .......... *G06F 9/505* (2013.01); *G06F 9/45558* (2013.01); *G06F 9/5077* (2013.01); *G06F 2009/4557* (2013.01)

(58) Field of Classification Search
CPC .................................................... G06F 9/5077
See application file for complete search history.

(56) References Cited

U.S. PATENT DOCUMENTS

| 2019/0102214 A1 | 4/2019 | Kondo et al. |
| 2020/0026625 A1* | 1/2020 | Konka ................ G06F 11/2028 |
| 2020/0257634 A1* | 8/2020 | Chen ................... G06F 12/1009 |

FOREIGN PATENT DOCUMENTS

| JP | 2004-178290 A | 6/2004 |
| JP | 2019-066985 A | 4/2019 |

OTHER PUBLICATIONS

Extended European Search Report dated Jul. 6, 2021 for corresponding European Patent Application No. 21150901.3, 8 pages.

* cited by examiner

*Primary Examiner* — Dong U Kim
(74) *Attorney, Agent, or Firm* — Fujitsu Patent Center

(57) ABSTRACT

A container image arrangement method executed by a processor included in a computer to execute a process, the computer being connected to each of a plurality of nodes, the process includes, identifying a first node that has a first storage storing a container image and has a largest number of containers started from the container image among the plurality of nodes, determining whether the container operating in the first node is capable of starting in a second node among the plurality of nodes other than the first node, where the second has a second storage storing the container image, and storing the container image in a third storage included in a third node different from each of the first node and the second node among the plurality of the nodes when it is determined that the container is not capable of starting in the second node.

11 Claims, 21 Drawing Sheets

FIG. 12A

<RESOURCE USAGE INFORMATION $F_1$>

| CPU USAGE RATE | MEMORY USAGE AMOUNT | TOTAL CAPACITY OF MEMORY |
|---|---|---|
| 50% | 4.6 GB | 16 GB |

FIG. 12B

<CONTAINER OPERATION INFORMATION $F_2$>

| CONTAINER | NUMBER OF OPERATIONS | CPU USAGE RATE | MEMORY USAGE AMOUNT |
|---|---|---|---|
| $C_1$ | 1 | 5% | 1.0 GB |
| $C_2$ | 2 | 30% | 2.0 GB |

FIG. 12C

<CONTAINER IMAGE STORAGE INFORMATION $F_3$>

| CONTAINER IMAGE |
|---|
| $IM_1$, $IM_2$ |

FIG. 14

<NODE-BY-NODE RESOURCE USAGE INFORMATION $G_i$>

| NODE | CPU USAGE RATE | MEMORY USAGE AMOUNT | TOTAL CAPACITY OF MEMORY |
|---|---|---|---|
| node #1 | 50% | 4.6 GB | 16 GB |
| node #2 | 90% | 9.2 GB | 16 GB |
| node #3 | 80% | 8.6 GB | 16 GB |
| node #4 | 60% | 5.4 GB | 16 GB |
| node #5 | 70% | 4.6 GB | 16 GB |

FIG. 15

<NODE-BY-NODE CONTAINER OPERATION INFORMATION $G_2$>

| NODE | CONTAINER | NUMBER OF OPERATIONS | CPU USAGE RATE | MEMORY USAGE AMOUNT |
|---|---|---|---|---|
| node #1 | $C_1$ | 1 | 5% | 1.0 GB |
| | $C_2$ | 2 | 30% | 2.0 GB |
| node #2 | $C_2$ | 4 | 60% | 4.0 GB |
| | $C_3$ | 1 | 10% | 1.0 GB |
| | $C_4$ | 1 | 10% | 1.0 GB |
| | $C_5$ | 2 | 10% | 3.2 GB |
| node #3 | $C_2$ | 1 | 15% | 4.0 GB |
| | $C_3$ | 1 | 10% | 1.0 GB |
| node #4 | $C_5$ | 1 | 5% | 1.0 GB |
| node #5 | $C_4$ | 1 | 10% | 2.0 GB |

FIG. 16

<NODE-BY-NODE CONTAINER IMAGE STORAGE INFORMATION $G_3$>

| NODE | CONTAINER IMAGE |
|---|---|
| node #1 | $IM_1$, $IM_2$ |
| node #2 | $IM_2$, $IM_3$, $IM_4$, $IM_5$ |
| node #3 | $IM_2$, $IM_3$ |
| node #4 | $IM_5$ |
| node #5 | $IM_4$ |

FIG. 17

<CONTAINER IMAGE ARRANGEMENT INFORMATION $G_4$>

| CONTAINER IMAGE | ARRANGEMENT DESTINATION NODE |
|---|---|
| $IM_1$ | node #1 |
| $IM_2$ | node #1, node #2, node #3 |
| $IM_3$ | node #2, node #3 |
| $IM_4$ | node #5 |
| $IM_5$ | node #4 |

FIG. 20

<CONTAINER IMAGE ARRANGEMENT INFORMATION $G_4$>

| CONTAINER IMAGE | ARRANGEMENT DESTINATION NODE |
|---|---|
| $IM_1$ | node #1 |
| $IM_2$ | node #1, node #2, node #3, node #4 |
| $IM_3$ | node #2, node #3 |
| $IM_4$ | node #5 |
| $IM_5$ | node #4 |

UPDATE → (row $IM_2$)

CONTAINER IMAGE ARRANGEMENT METHOD AND NON-TRANSITORY COMPUTER-READABLE MEDIUM

CROSS-REFERENCE TO RELATED APPLICATION

This application is based upon and claims the benefit of priority of the prior Japanese Patent Application No. 2020-051290 filed on Mar. 23, 2020, the entire contents of which are incorporated herein by reference.

FIELD

A certain aspect of the embodiments is related to a container image arrangement method and a non-transitory computer-readable medium.

BACKGROUND

VM (Virtual Machine) virtualization technology and container virtualization technology are known as technologies for virtualizing computers. Among these, the VM virtualization technology is a technology that performs virtualization by executing a guest OS (Operating System) on a host OS, and has large overhead for executing the guest OS.

On the other hand, the container virtualization technology is a technology that virtualizes using only a part of a kernel of the guest OS. Since only the part of the kernel is used in this way, the container virtualization technology has an advantage that the overhead for virtualization is small and light compared with the VM virtualization technology. In the container virtualization technology, a plurality of user spaces are generated independent of each other. These user spaces are called containers, and an application program is executed in each of the containers. For example, there is DOCKER (registered trademark) as a container engine which is a program for generating the containers.

Since the container has small overhead for virtualization as described above, the container can be easily migrated between nodes. Therefore, it is possible to easily construct a system having excellent scalability by generating the container for each of the plurality of nodes.

However, in the system using the container in this way, there is room for improvement in that a container that was started in the failed node can be start quickly in the other node. Note that the technique related to the present disclosure is disclosed in Japanese Laid-open Patent Publication No. 2019-66985.

SUMMARY

According to an aspect of the present disclosure, there is provided a container image arrangement method executed by a processor included in a computer to execute a process, the computer being connected to each of a plurality of nodes, the process including: identifying a first node that has a first storage storing a container image and has a largest number of containers started from the container image among the plurality of nodes; determining whether the container operating in the first node is capable of starting in a second node among the plurality of nodes other than the first node, where the second has a second storage storing the container image; and storing the container image in a third storage included in a third node different from each of the first node and the second node among the plurality of the nodes when it is determined that the container is not capable of starting in the second node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12A is a schematic diagram of resource usage information according to the present embodiment;

FIG. 12B is a schematic diagram of container operation information according to the present embodiment;

FIG. 12C is a schematic diagram of container image storage information according to the present embodiment;

FIG. 14 is a schematic diagram of node-by-node resource usage information according to the present embodiment;

FIG. 15 is a schematic diagram of node-by-node container operation information according to the present embodiment;

FIG. 16 is a schematic diagram of node-by-node container image storage information according to the present embodiment;

FIG. 17 is a schematic diagram of container image arrangement information according to the present embodiment;

FIG. 20 is a schematic diagram illustrating an example of container image arrangement information G4 updated by a node determination unit in the case of i=2 and FIG. 21 is a diagram illustrating the hardware configuration of the master node according to the present embodiment.

DESCRIPTION OF EMBODIMENTS

Prior to the description of the present embodiment, matters studied by an inventor will be described.

Figure 1:
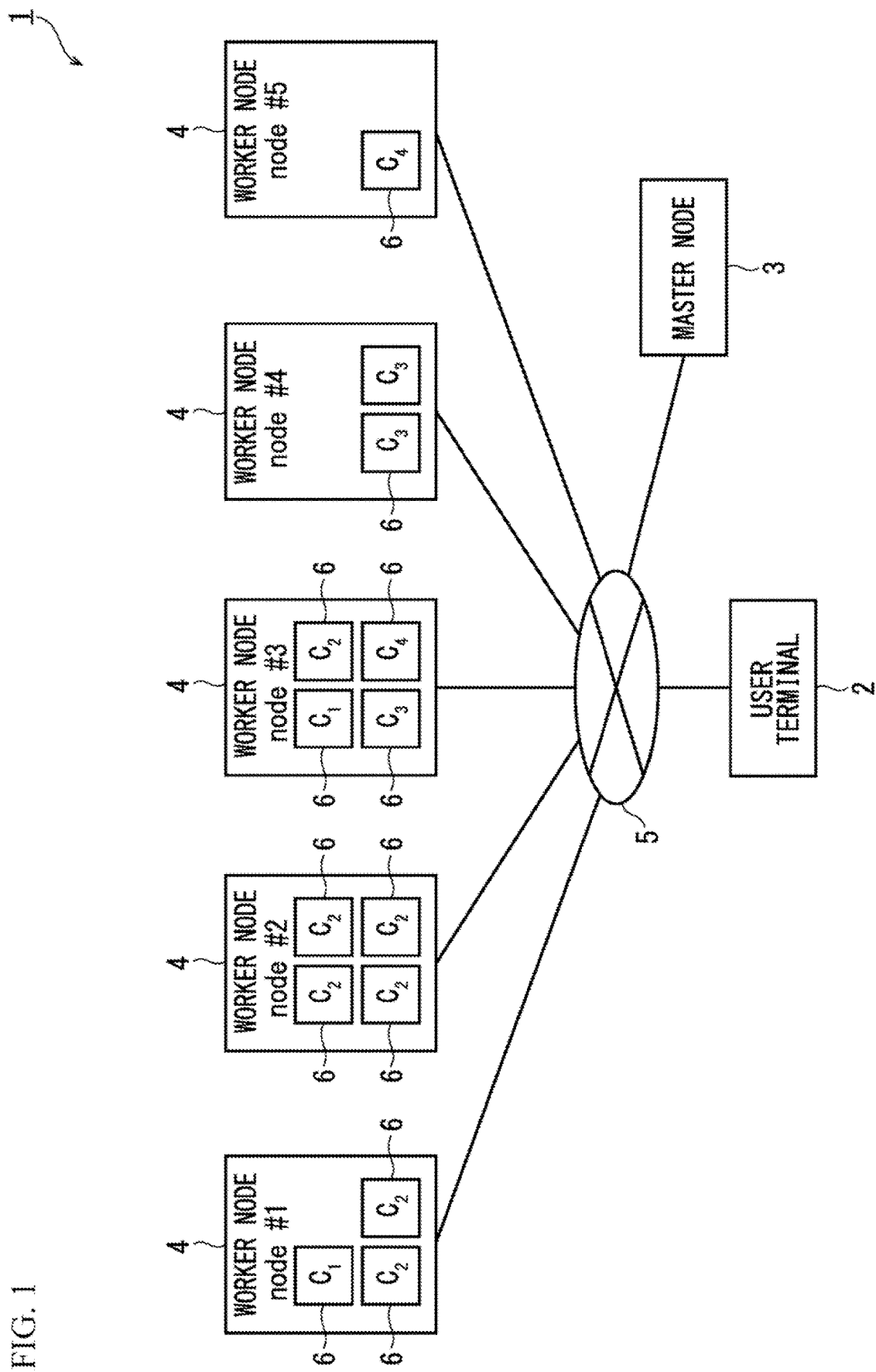
FIG. 1 is a diagram illustrating the configuration of a system used in the study.

FIG. 1 is a diagram illustrating the configuration of a system used in the study. A system 1 is a system for providing a service to a user terminal 2 such as a PC (Personal Computer), and includes a master node 3 and a plurality of worker nodes 4. The master node 3 and each worker node 4 are physical servers for example, and are connected to each other via a network 5 such as a LAN (Local Area Network). Virtual servers may be used as the master node 3 and each worker node 4. Hereinafter, respective worker nodes 4 are identified by character strings "node #1" "node #2", "node #3", "node #4" and "node #5".

Each of the worker nodes 4 executes a container engine such as DOCKER (registered trademark) on the host OS, so that each of a plurality of containers 6 starts in each worker node 4. Here, each of the plurality of containers 6 is uniquely identified by a name "$C_i$" (i=1, 2, . . . 5). Two containers 6 with different names have different images of guest OSs to be used.

The worker node 4 executes an application program having a different function in each of the containers 6, and hence a service combining these application programs is provided to the user terminal 2. In this way, an architecture that combines application programs having different functions is also called a microservice architecture.

Figure 2:
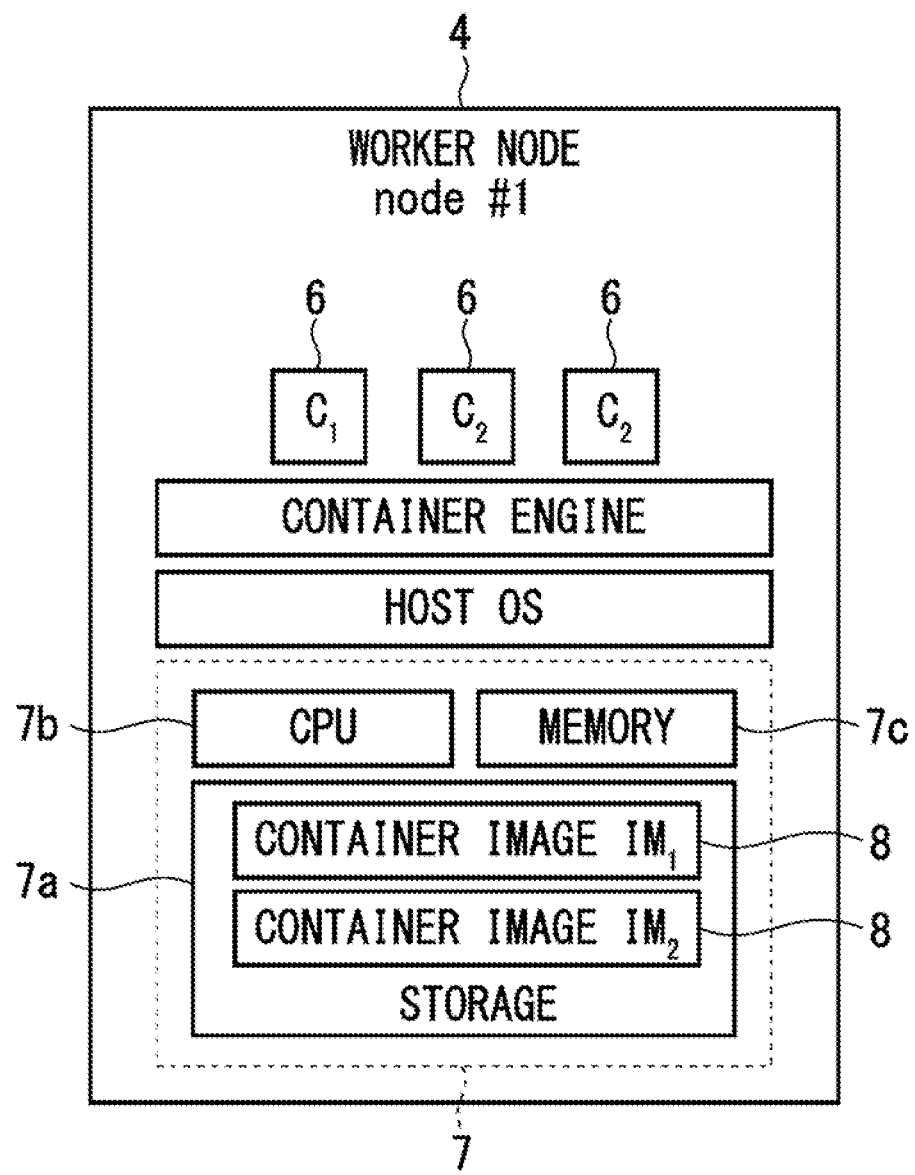
FIG. 2 is a schematic diagram of a single worker node in the system used in the study.

FIG. 2 is a schematic diagram of the single worker node 4. As illustrated in FIG. 2, the worker node 4 includes a storage 7a, a CPU (Central Processing Unit) 7b and a memory 7c, as physical resources 7. The storage 7a is a storage device such as an HDD (Hard Disk Drive) or an SSD (Solid State Drive), and stores container images 8. Each container image 8 is an image file that stores a part of a kernel of the guest OS. Here, a name of the container image 8 for starting the container 6 with a name "$C_i$" is represented by "$IM_i$". For example, the container 6 of "$C_2$" is started from the container image 8 of "$IM_2$".

The CPU 7b and the memory 7c cooperate with each other to execute the above-mentioned container engine, so that the container 6 is started from the container image 8 stored in the storage 7a.

By the way, in the system 1 illustrated in FIG. 1, it is necessary to start the container 6 that was started in the failed worker node 4 in other worker node 4, in order to continue to provide the service even if a part of the worker nodes 4 fails.

Figure 3:
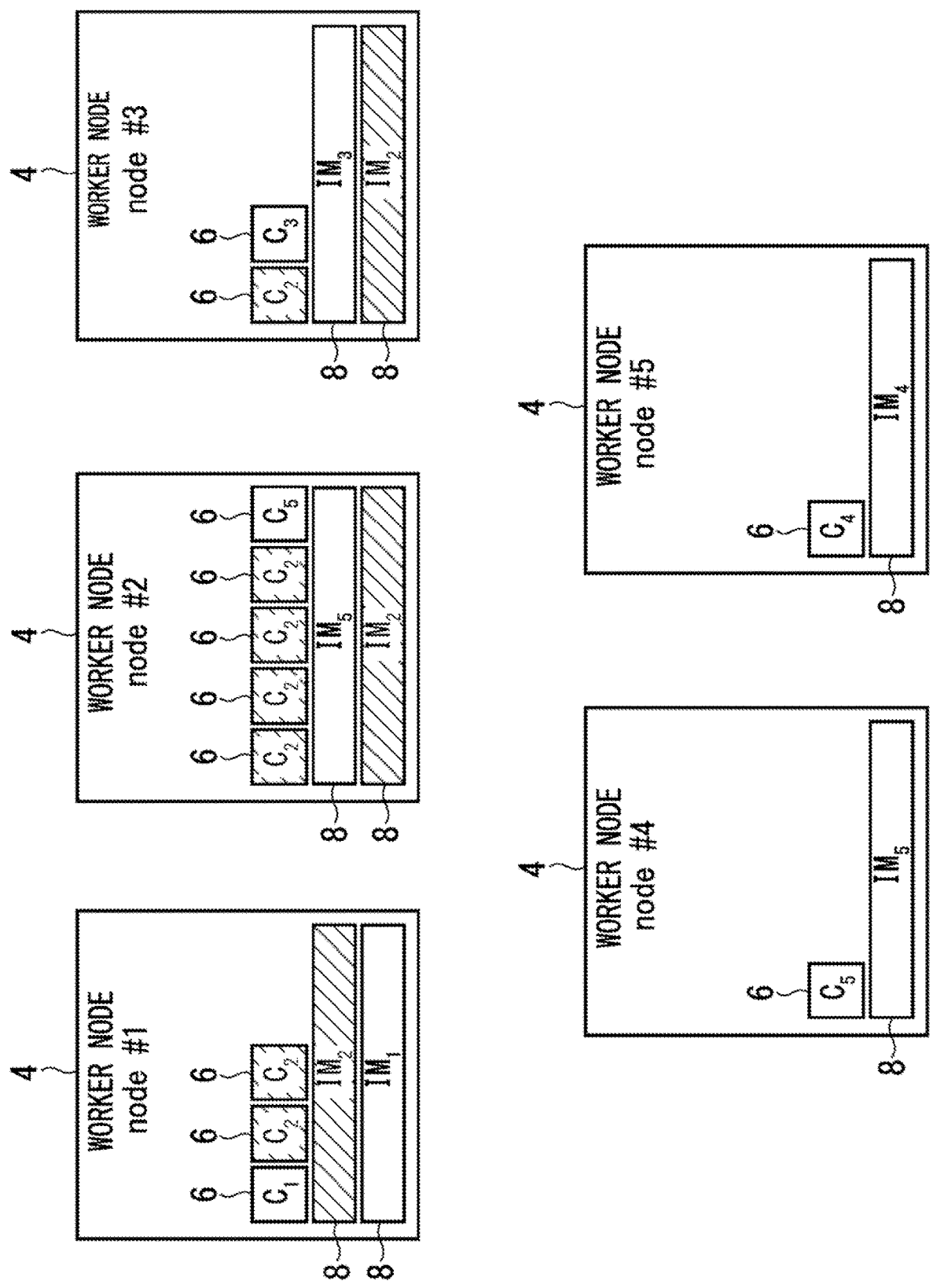
FIG. 3 is a schematic diagram of the system used in the study at a normal time before failure.

FIG. 3 is a schematic diagram of the system used in the study at a normal time before failure. In this example, it is assumed that four containers 6 of "$C_2$" are started in the worker node 4 of "node #2".

Figure 4:
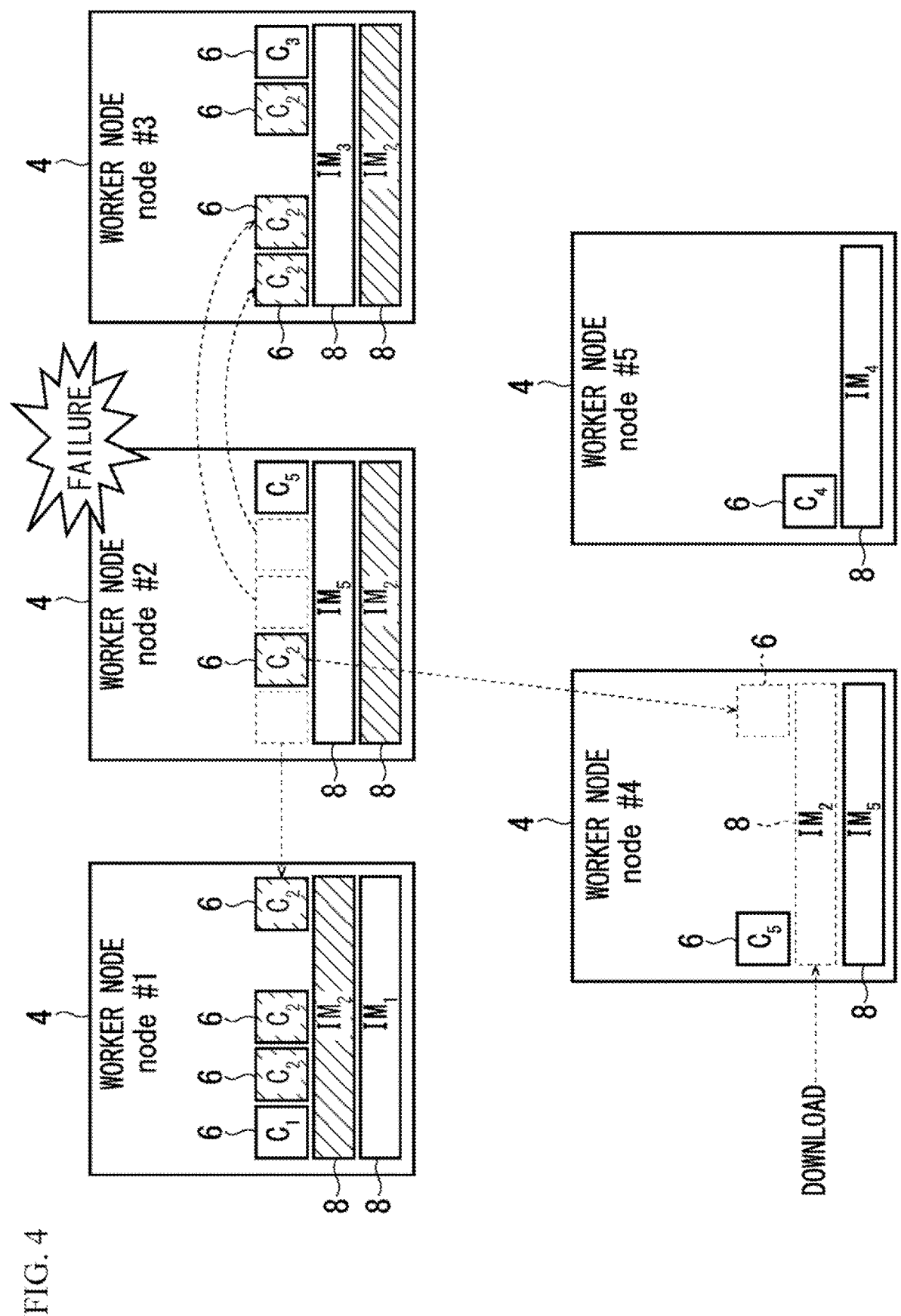
FIG. 4 is a schematic diagram of the system used in the study at a failure time.

FIG. 4 is a schematic diagram of the system used in the study at a failure time. As illustrated in FIG. 4, a case where the worker node 4 of the "node #2" fails is considered. In this case, the four containers 6 of "$C_2$" in the failed "node #2" cannot be used. Therefore, in order to continue to provide the service in the system 1, it is necessary to newly start the four containers 6 in the worker node 4 other than "node #2".

Here, it is assumed that the container 6 of "$C_2$" operates in the worker nodes 4 of "node #1" and "node #3" as with the worker node 4 of "node #2" before the failure. In this case, the container image 8 of "$IM_2$" required to start the container 6 of "$C_2$" is stored in the storage 7a of each of the worker nodes 4 of "node #1" and "node #3". Therefore, when the container image 8 is used, the container 6 of "$C_2$" can start immediately in each of the worker nodes 4 of "node #1" and "node #3".

However, when the containers 6 other than "$C_2$" operates in the worker nodes 4 of "node #1" and "node #3", an amount of surplus resources such as the CPU 7b and the memory 7c in the worker nodes 4 may be insufficient.

In this case, each the worker node 4 of "node #1" and "node #3" has only an amount of resources that can start only a part of the four containers 6 of "$C_2$" that operate in the worker node 4 of "node #2". For example, it is assumed that the worker node 4 of "node #1" has only an amount of surplus resources that can start only a single container 6 of "$C_2$", and the worker node 4 of "node #3" has only an amount of surplus resources that can start only two containers 6 of "$C_2$". In this case, it is necessary to start a single remaining container 6 of "$C_2$" included in the worker node of "node #2", in the other worker node 4 that does not have the container image 8 of "$IM_2$".

For example, a case where the container 6 of "$C_2$" is started by the worker node 4 of "node #4" is considered. Since the storage 7a in the worker node 4 of "node #4" does not have the container image 8 of "$IM_2$", it is necessary to download the container image 8 to the worker node 4 of "node #4". A download source is a predetermined server connected to the network 5 (see FIG. 1), for example. Since this download takes some time, the container 6 of "$C_2$" cannot start immediately in the worker node 4 of "node #4", and the availability of the system 1 is reduced.

A time from downloading the container image 8 to starting the container 6 depends on a capacity of the container image 8 and a line speed of the network 5. As an example, when the container image 8 is already downloaded, a startup time of the container 6 is about several seconds. On the other hand, when the container image 8 is not downloaded yet, it takes more than ten seconds from downloading the container image 8 to starting the container 6. The following measure can be considered to make such download unnecessary.

Figure 5:
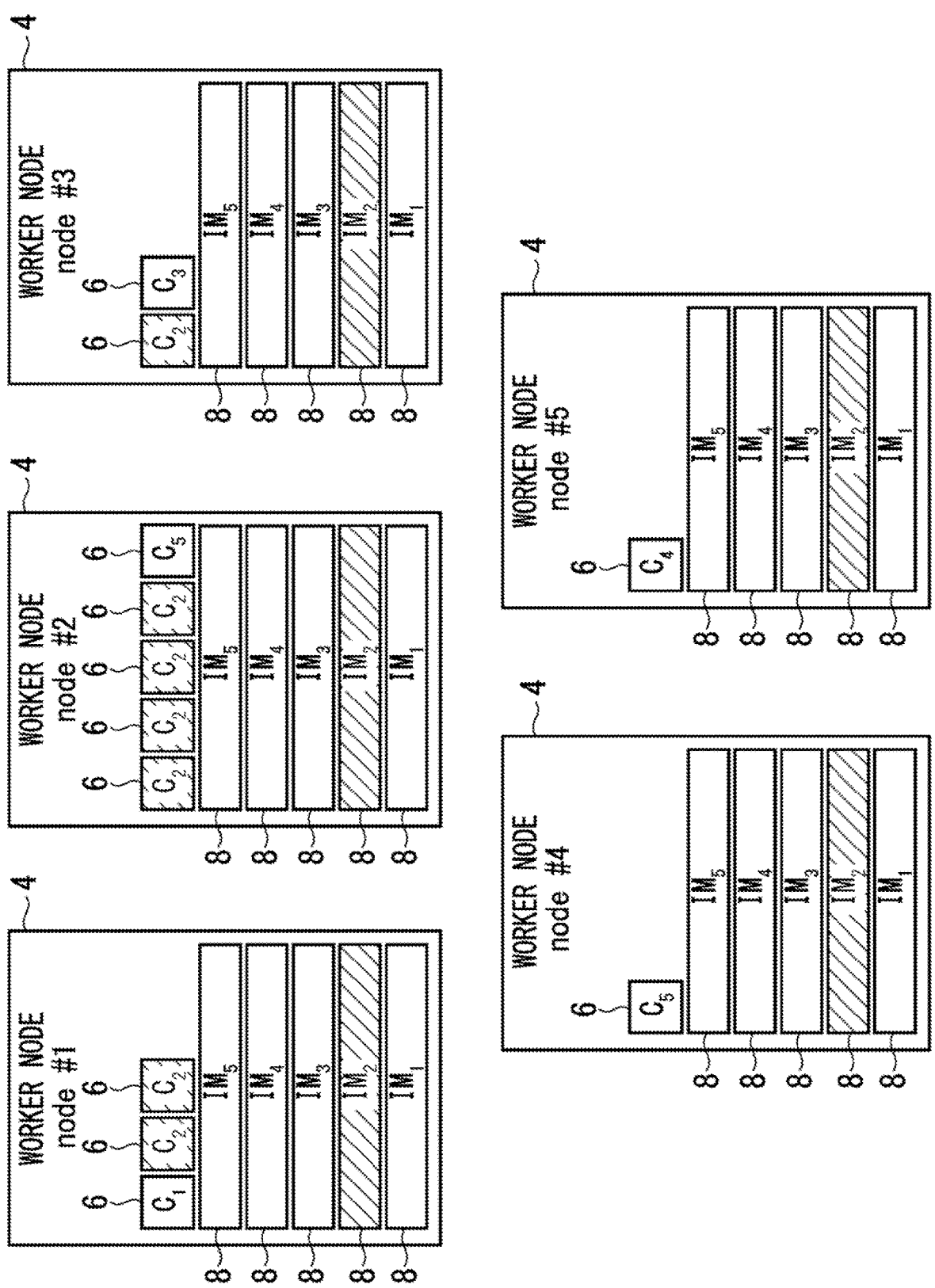
FIG. 5 is a schematic diagram illustrating a measure for making download unnecessary.

FIG. 5 is a schematic diagram illustrating a measure for making the download unnecessary. In this example, all the container images 8 of "$IM_1$" to "$IM_5$" are stored in advance in the storages 7a of all the worker nodes 4 of "node #1" to "node #5", as illustrated in FIG. 5. Thereby, even if any of the worker nodes 4 fails, the remaining worker nodes 4 can start the containers 6 of "$C_1$" to "$C_5$" without downloading the container images 8, thereby increasing the availability of the system 1.

However, in this case, since the container images 8 that are not normally used are stored in the storage 7a, the capacity of the storage 7a is wasted.

Present Embodiment

Figure 6:
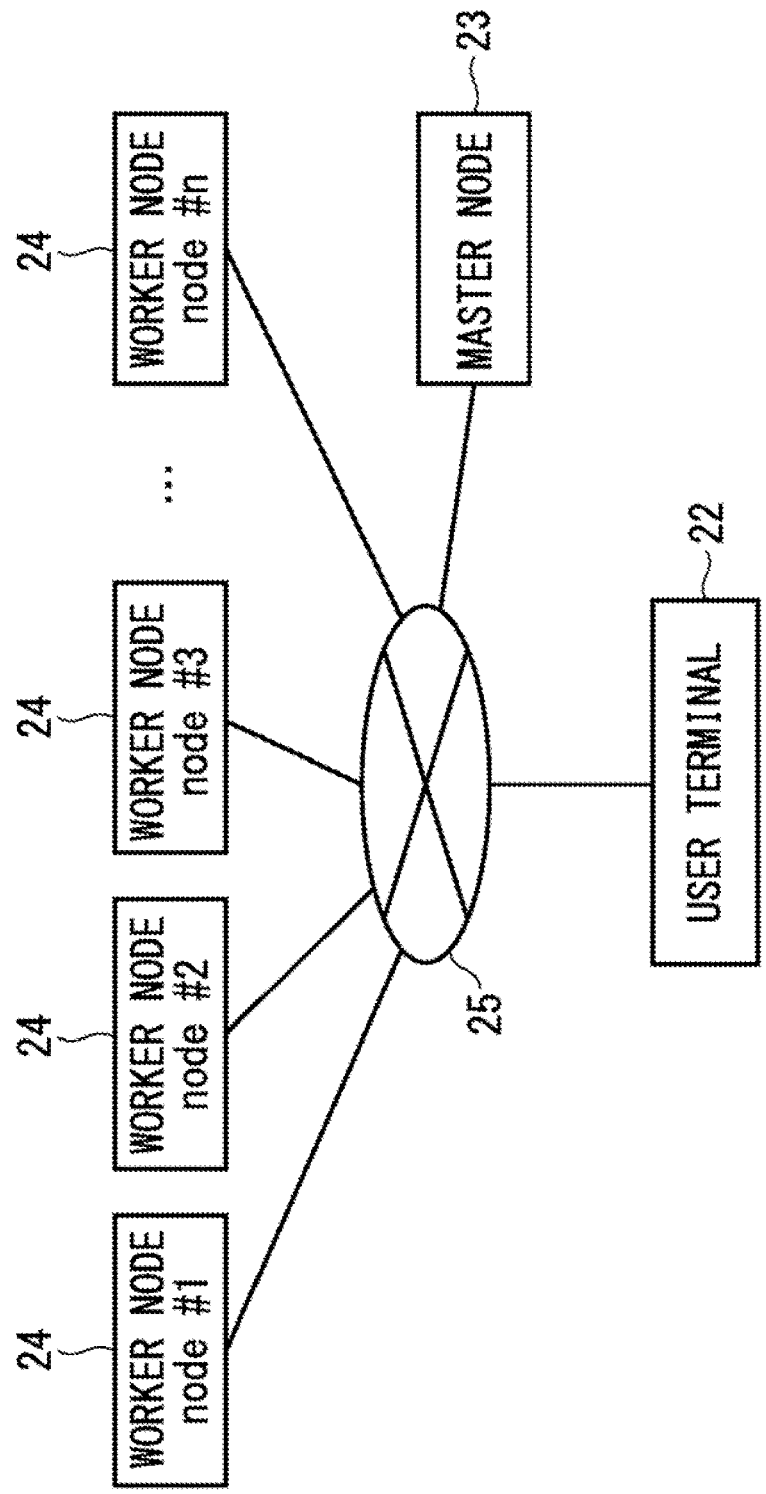
FIG. 6 is a diagram illustrating the system configuration of a system according to a present embodiment.

FIG. 6 is a diagram illustrating the system configuration of a system according to a present embodiment. A system 21 is a system for providing services to a user terminal 22 such as the PC, and includes a master node 23 and a plurality of worker nodes 24. Each of the master node 23 and the worker nodes 24 is a computer such as a physical server. The master node 23 and the worker nodes 24 are connected to each other via a network 25 such as a local area network (LAN). Here, each of the worker nodes 24 is identified by any one of character strings "node #1", "node #2", . . . and "node #n" for uniquely identifying each of the worker nodes 24.

The system 21 may be constructed by using a cloud service provided by a cloud operator. In this case, the plurality of physical servers in the data center of the cloud operator are the master node 23 and the worker nodes 24. Further, the master node 23 and the worker nodes 24 may be realized by virtual servers.

Figure 7:
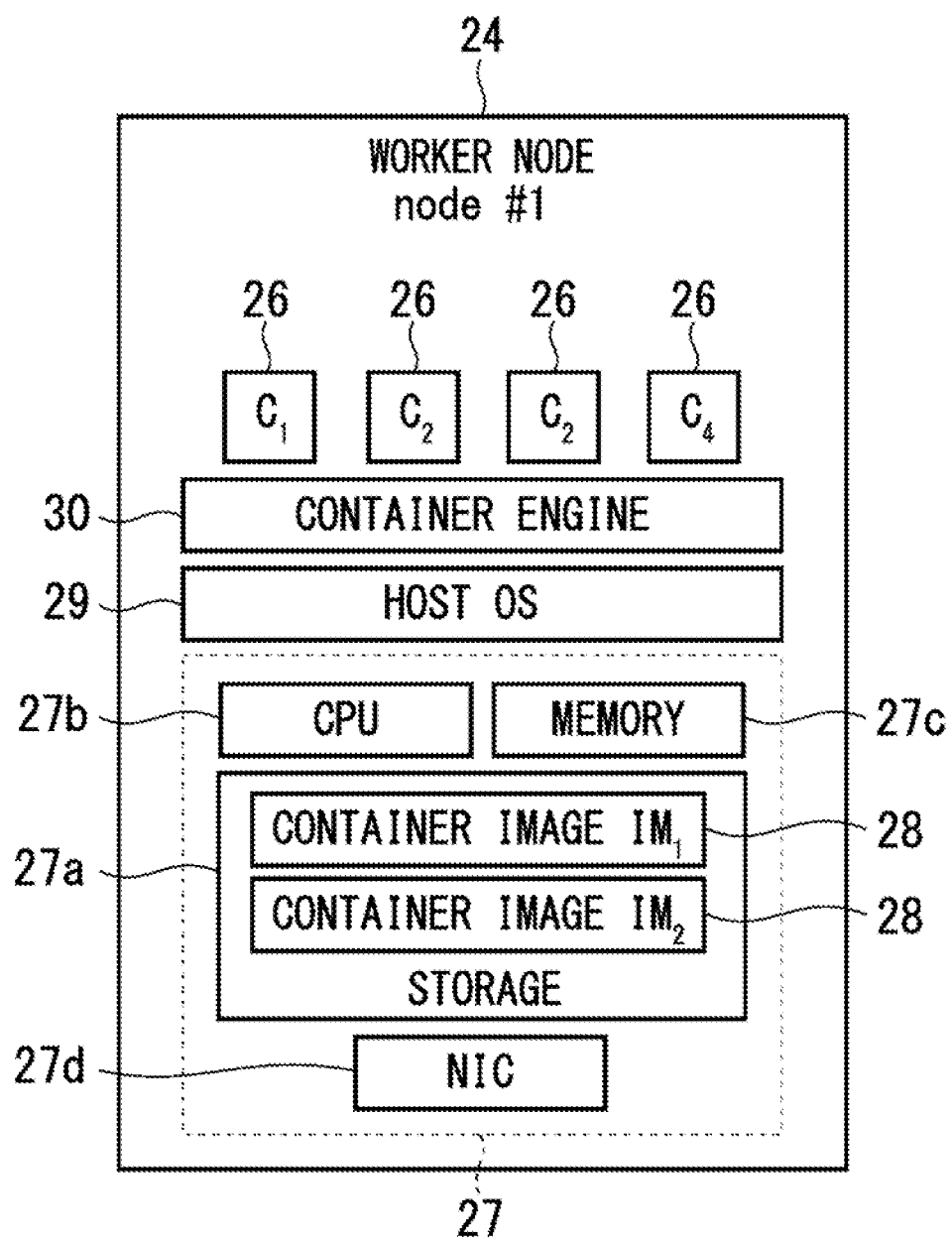
FIG. 7 is a schematic diagram of a worker node according to the present embodiment.

FIG. 7 is a schematic diagram of the worker node 24 according to the present embodiment. The worker node 24 includes a storage 27a, a CPU 27b, a memory 27c, and a NIC (Network Interface Card) 27d as physical resources 27. The storage 27a is a storage device such as an HDD or SSD, and stores at least one container image 28. The container image 28 is an image file that stores a part of the guest OS such as Linux (registered trademark). Also in the present embodiment, a name of the container image 28 for starting a container 26 with a name "$C_i$" is represented by "$IM_1$", as with the example of FIG. 2.

Then, the CPU 27b and the memory 27c cooperate to execute a host OS 29. The CPU 27b and the memory 27c cooperate to execute a container engine 30 such as the DOCKER (registered trademark) on the host OS 29, so that the container 26 is started from the container image 28 stored in the storage 27a. Further, the CPU 27b and the memory 27c execute inside each container 26 an application program for providing the service to the user terminal 22 by the microservice architecture, for example.

The NIC 27d is a communication interface for connecting the worker node 24 to the network 25.

Figure 8:
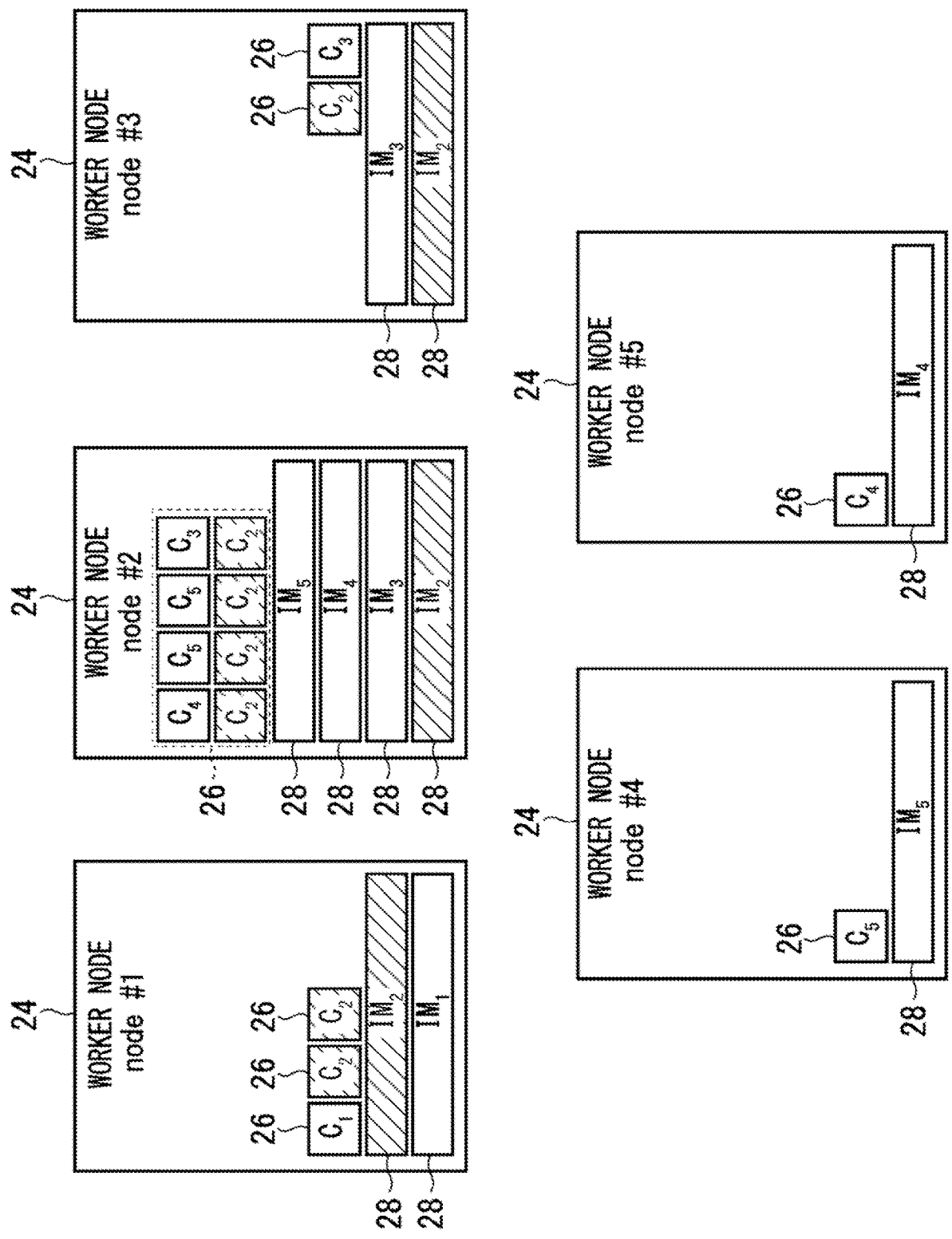
FIG. 8 is a schematic diagram illustrating an outline of a container image arrangement method according to the present embodiment (part 1)
Figure 9:
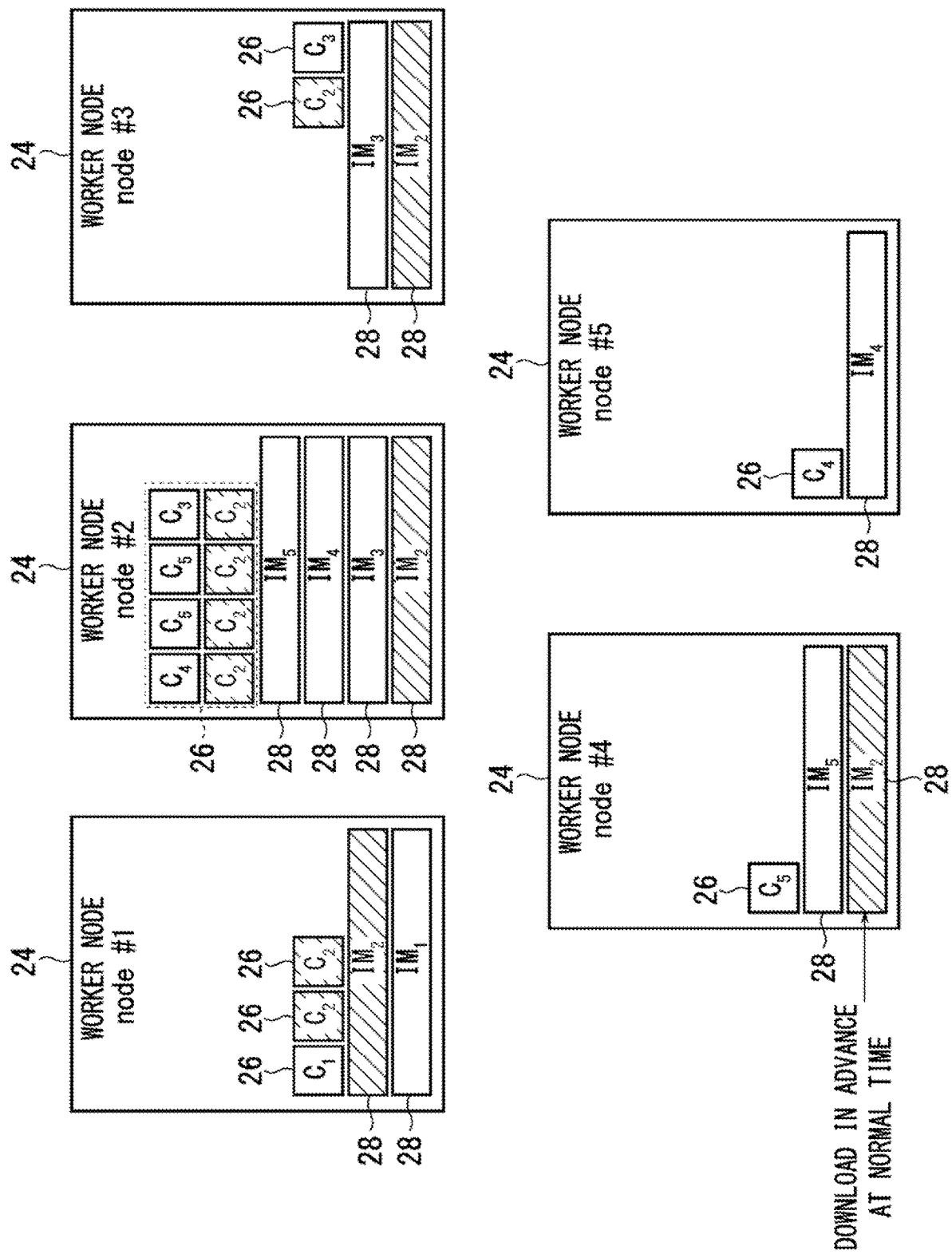
FIG. 9 is a schematic diagram illustrating the outline of the container image arrangement method according to the present embodiment (part 2)
Figure 10:
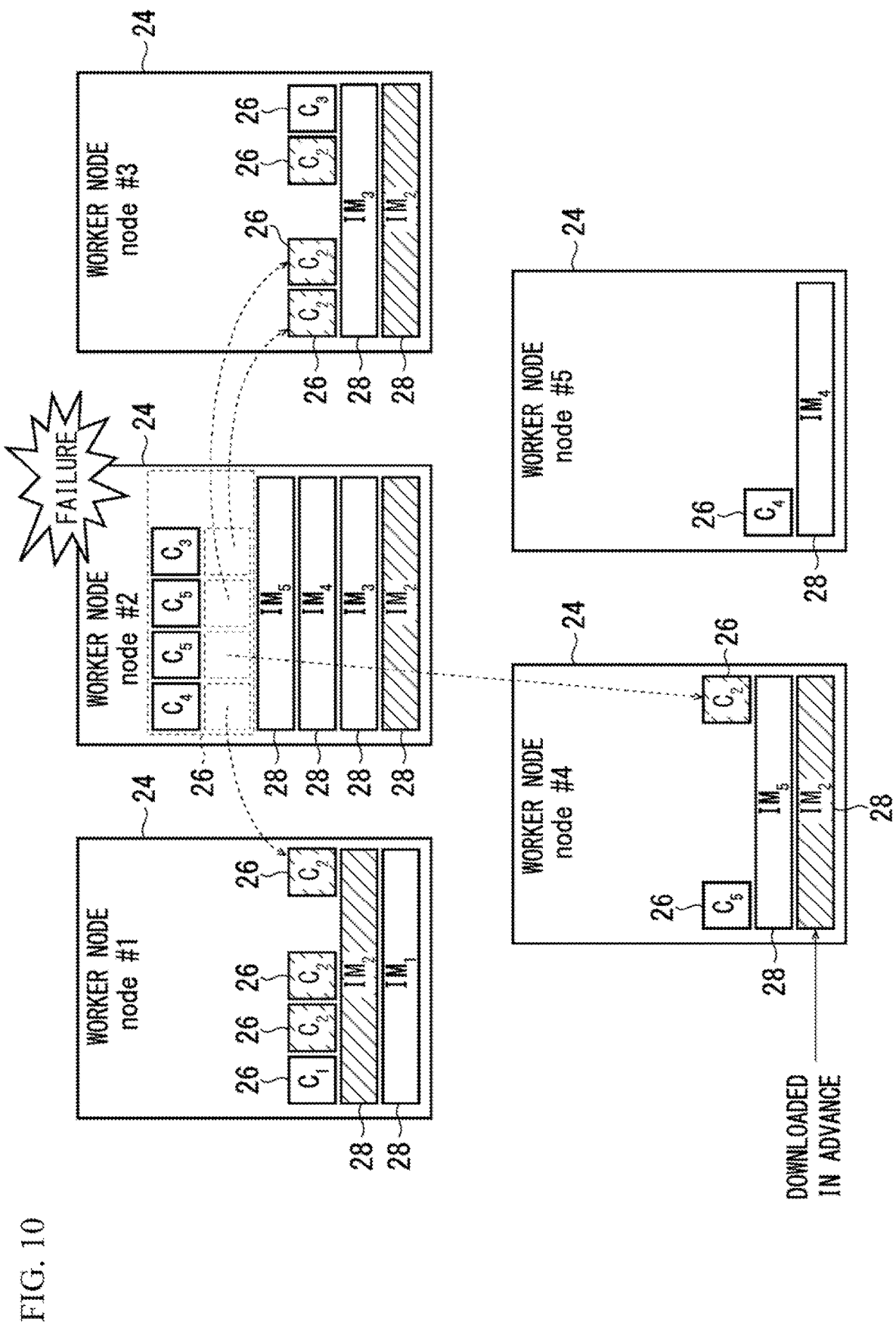
FIG. 10 is a schematic diagram illustrating the outline of the container image arrangement method according to the present embodiment (part 3)

Next, a description is given of an outline of a container image arrangement method according to the present embodiment. FIGS. 8 to 10 are schematic diagrams illustrating the outline of the container image arrangement method according to the present embodiment.

In this example, it is assumed that the container image 28 of "$IM_2$" is stored in the storage 27a of each of the worker nodes 24 of "node #1", "node #2" and "node #3", as illustrated in FIG. 8. Further, a case where the container 26 of "$C_2$" started from the container image 28 of "$IM_2$" operates in the worker nodes 24 of "node #1", "node #2" and "node #3" is considered.

When the worker node 24 of "node #2" fails in this state, all the containers 26 of "$C_2$" in the worker node 24 of "node #2" need to be started anew by other worker nodes 24 in order for the system 21 to continue to provide the service.

The worker nodes 24 that can anew and immediately start the container 26 of "$C_2$" are the worker nodes 24 of "node #1" and "node #3" that store the container image 28 of "$IM_2$" corresponding to "$C_2$".

However, in the worker node 24 of "node #2", the number of containers 26 of "$C_2$" in operation is 4, and the number of containers 26 of "$C_2$" in operation is the largest among all the worker nodes 24. Therefore, there is a possibility that amounts of resources required to start all the containers 26 of "$C_2$" operating in "node #2" cannot be secured in "node #l" and "node #3".

Therefore, in the present embodiment, before the worker node 24 fails, the master node 23 identifies the worker node 24 of "node #2" as a node having the largest number of containers 26 of "$C_2$" in advance.

Further, the master node 23 determines whether the amounts of resources required to start all the containers 26 of "$C_2$" operating in "node #2" can be secured in "node #1" and "node #3". When it is determined that the amounts of resources cannot be secured, the master node 23 instructs the worker node 24 of "node #4" or "node #5" that does not store the container image 28 of "IM-" to download the container image 28.

FIG. 9 is a schematic diagram illustrating a case where the container image 28 of "$IM_2$" is downloaded according to the instruction.

FIG. 9 illustrates a case where the master node 23 instructs the worker node 24 of "node #4" to download the container image 28 of "$IM_2$".

FIG. 10 is a schematic diagram illustrating a case where the worker node 24 of "node #2" actually fails in this state.

FIG. 10 illustrates a case where three out of the four containers 26 of "$C_2$" that operated in the worker node 24 of "node #2" before the failure are newly started in the worker nodes 24 of "node #1" and "node #3". And, the worker nodes 24 of "node #1" and "node #3" do not have the amount of resources to start the remaining single container 26 of "2,", and the remaining single container 26 is started in the worker node 24 of "node #4".

In the present embodiment, the worker node 24 of "node #4" downloads the container image 28 of "$IM_2$" in advance before the failure of the worker node 24 of "node #2". Therefore, the worker node 24 of "node #4" does not need to download the container image 28 after the failure, and the container 26 of "$C_2$" can start quickly in the worker node 24 of "node #4" without wasting download time.

Next, the container image arrangement method according to the present embodiment is described with reference to the functional configuration of each of the worker nodes 24 and the master node 23.

Figure 11:
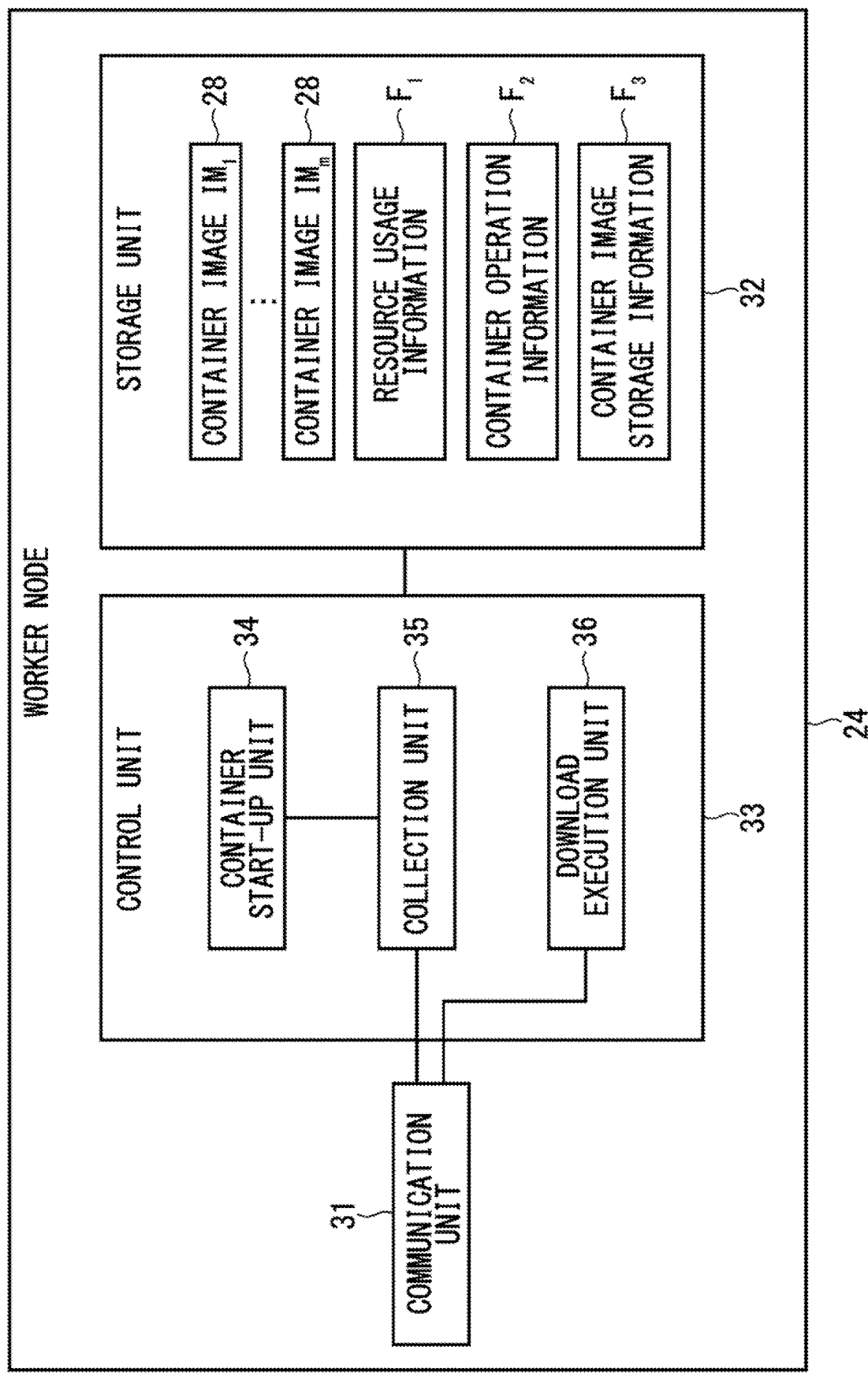
FIG. 11 is a functional configuration diagram of the worker node according to the present embodiment.

FIG. 11 is a functional configuration diagram of the worker node 24 according to the present embodiment. As illustrated in FIG. 11, the worker node 24 includes a communication unit 31, a storage unit 32 and a control unit 33. The communication unit 31 is a processing unit realized by the NIC 27d (see FIG. 7), and communicates with the master node 23 via the network 25.

The storage unit 32 is an example of first to fourth storage units, and is realized by the storage 27a (see FIG. 7) and the memory 27c. The storage unit 32 stores the container image 28. FIG. 11 illustrates an example in which the storage unit 32 stores the container images 28 whose names are "$IM_1$" to "$IM_m$", but the names of the container images 28 may be different for each of the worker nodes 24.

Further, the storage unit 32 stores resource usage information $F_1$, container operation information $F_2$ and container image storage information $F_3$.

FIGS. 12A to 12C are schematic diagrams illustrating the resource usage information, the container operation information and the container image storage information, respectively. As illustrated in FIG. 12A, the resource usage information FE is information indicating the amount of resources currently used by its own node. The amount of resources includes a usage rate of the CPU 27b and a usage amount of the memory 27c. A total capacity of the memory 27c is also stored in the resource usage information $F_1$.

As illustrated in FIG. 1213, the container operation information $F_2$ is information in which the container 26, the number of operations, a CPU usage rate and a memory usage amount are associated with each other. The number of operations is the number of containers 26 operating in the its own node. The CPU usage rate and the memory usage amount represent a usage rate of the CPU and a usage amount of the memory which are used by the container 26.

When the number of operations is plural, a total value of the CPU usage rates used by all of the plurality of containers 26 in operation is stored in the container operation information $F_2$. For example, in the container 26 of "$C_2$" in which number of operations is "2", the total value of the CPU usage rates of the two containers 26 is "30%". The same also applies to the memory usage amount.

As illustrated in FIG. 12C, the container image storage information $F_3$ is information indicating the container image 28 stored in the storage 27a of its own node.

Each of the resource usage information $F_1$, the container operation information $F_2$ and the container image storage information $F_3$ is periodically transmitted by the communication unit 31 to the master node 23 at intervals of about several seconds to several minutes.

Referring again to FIG. 11, the control unit 33 is a processing unit that controls the entire master node 23, and is realized by the CPU 27b and the memory 27c. In this example, the control unit 33 has a container start-up unit 34, a collection unit 35, and a download execution unit 36.

The container start-up unit 34 is a processing unit that starts the container 26 by using the container image 28.

The collection unit 35 is a processing unit that periodically collects the resource usage information $F_1$, the container operation information $F_2$ and the container image storage information $F_1$, as described above, and stores them in the storage unit 32.

For example, the collection unit 35 collects the CPU usage rate, the memory usage amount, and the total memory capacity of its own device managed by the host OS 29, and stores them in the resource usage information $F_1$. The collection unit 35 acquires the number of containers 26 operating in the own device, the CPU usage rate and the memory usage amount of the container 26 from the host OS 29, and stores them in the container operation information $F_2$. Further, the collection unit 35 acquires the name of the container image stored in the storage 27a of its own device from the host OS 29 and stores it in the container image storage information $F_3$.

The download execution unit 36 is a processing unit that downloads the container image 28 from the network 25 and stores it in the storage unit 32 when receiving an instruction from the master node 23.

Figure 13:
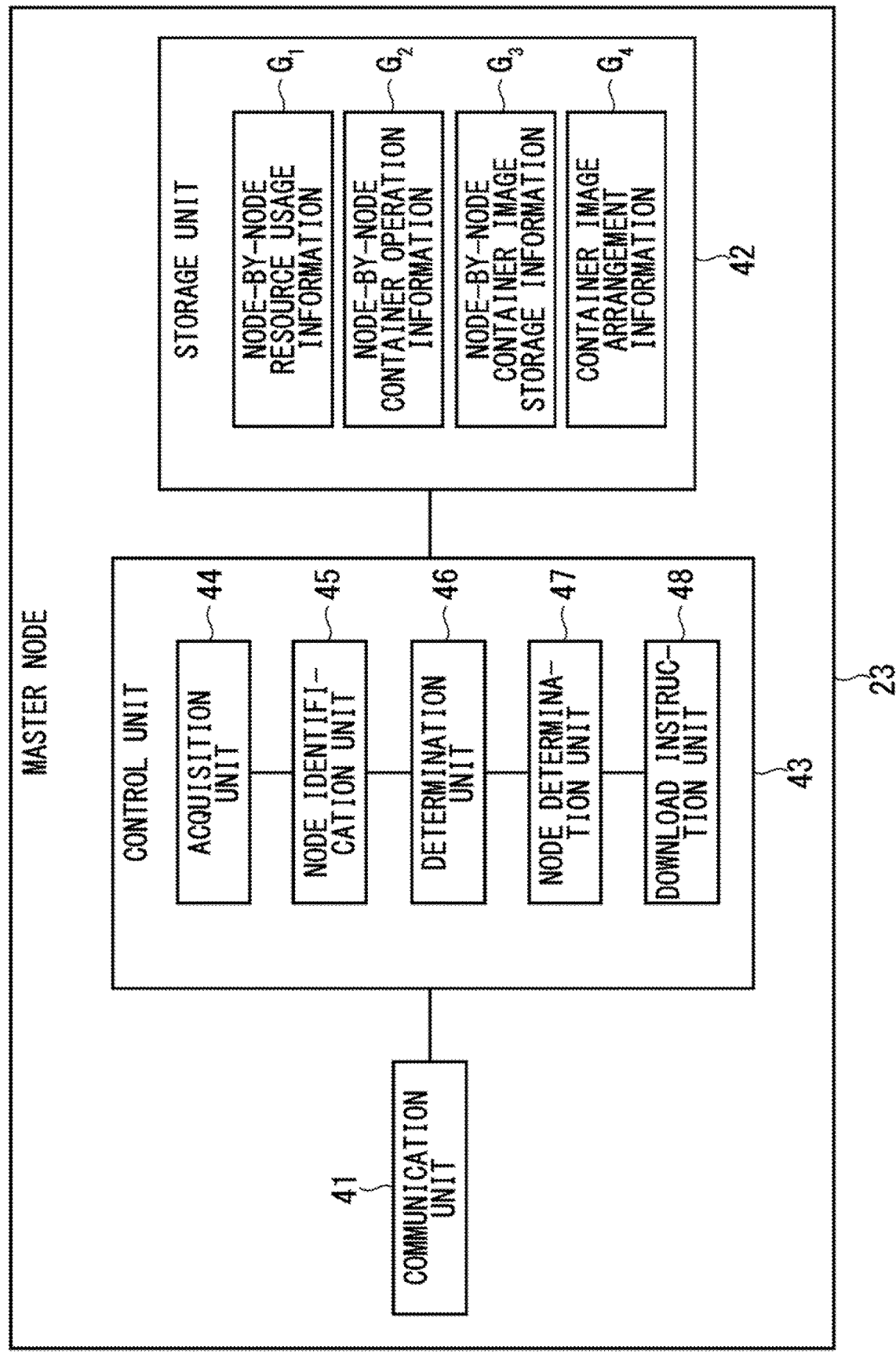
FIG. 13 is a functional configuration diagram of a master node according to the present embodiment.

FIG. 13 is a functional configuration diagram of the master node 23 according to the present embodiment. As illustrated in FIG. 13, the master node 23 includes a communication unit 41, a storage unit 42, and a control unit 43.

The communication unit 41 is a processing unit that communicates with the master node 23 via the network 25.

The storage unit 42 is an HDD or a memory, and stores node-by-node resource usage information $G_1$, node-by-node container operation information $G_2$, node-by-node container image storage information $G_3$, and container image arrangement information $G_4$.

FIG. 14 is a schematic diagram of the node-by-node resource usage information G t. As illustrated in FIG. 14, the node-by-node resource usage information G is information indicating the CPU usage rate, the memory usage amount and the total memory capacity for each worker node 24. The master node 23 collects the resource usage information $F_1$ (see FIG. 12A) from each worker node 24 and merges them to generate the node-by-node resource usage information $G_1$.

FIG. 15 is a schematic diagram of the node-by-node container operation information $G_2$. The node-by-node container operation information $G_2$ is information in which the container 26, the number of operations, the CPU usage rate and the memory usage amount for each of the worker nodes 24 are associated with each other. These items are the same as the items in the container operation information $F_2$ (see FIG. 12B). The master node 23 collects the container operation information $F_2$ from each worker node 24 and merges them to generate the node-by-node container operation information $G_2$.

When the number of operations in any worker node 24 is plural, the total value of the CPU usage rates used by all of the plurality of containers 26 operating in the worker node 24 is stored in the node-by-node container operation information $G_2$. For example, in the containers 26 of "$C_2$" in which the number of operations is "4" in the worker node of "node #2", the total value of the CPU usage rates of the four containers 26 is "60%". The same also applies to the memory usage amount.

FIG. 16 is a schematic diagram of the node-by-node container image storage information $G_3$. The node-by-node container image storage information $G_3$ is information in which the container image 28 stored in the storage unit 32 of the worker node 24 is associated with the worker node 24. The master node 23 collects the container image storage information $F_3$ from each worker node 24 (see FIG. 12C) and merges them to generate the node-by-node container image storage information $G_3$.

FIG. 17 is a schematic diagram of the container image arrangement information $G_4$. The container image arrangement information $G_4$ is information indicating the worker node 24 where it is recommended to arrange the container image 28 in advance in case of the failure of the worker node 24. For example, it is recommended that the container image 28 of "$IM_2$" for starting the container 26 of "$C_2$" is stored in the storage 27a of each of the worker nodes 24 of "node #", "node #2" and "node #3".

Referring again to FIG. 13, the control unit 43 is a processing unit that controls the overall operation of the master node 23, and includes an acquisition unit 44, a node identification unit 45, a determination unit 46, a node determination unit 47 and a download instruction unit 48.

The acquisition unit 44 is a processing unit that collects the resource usage information $F_1$, the container operation information $F_2$ and the container image storage information $F_1$ of FIGS. 12A to 12C from each worker node 24 via the communication unit 41. The acquisition unit 44 merges the resource usage information $F_1$ of the respective worker nodes 24 to generate the node-by-node resource usage information $G_1$, and stores it in the storage unit 42. Similarly, the acquisition unit 44 merges the container operation information $F_2$ of the respective worker nodes 24 to generate the node-by-node container operation information $G_2$, and stores it in the storage unit 42. Further, the acquisition unit 44 merges the container image storage information $F_3$ of the respective worker nodes 24 to generate the node-by-node container image storage information $G_3$, and stores it in the storage unit 42.

The node identification unit 45 identifies a node in which the container image 28 of "CM," is stored in the storage 27a among the plurality of worker nodes 24, based on the node-by-node container image storage information $G_3$ (see FIG. 16). For example, in the case of i=2, each of the worker nodes 24 of "node #1", "node #2" and "node #3" is identified.

Further, the node identification unit 45 identifies a node having the largest number of containers 26 of "$C_i$" in operation started from the container image 28 of "$IM_i$" among the worker nodes 24, based on the node-by-node container operation information $G_2$ (see FIG. 15). In the example of FIG. 15, in the case of i=2, the worker node 24 of "node #2" which has the largest number of containers 26 of "$C_2$" in operation, i.e., four containers 26 is identified.

The determination unit 46 is a processing unit that determines whether the container 26 of "$C_i$" operating in the worker node 24 identified by the node identification unit 45 can start in the other worker node 24 that stores the container image 28 of "IM".

In the above-mentioned example of i=2, the determination unit 46 determines whether the four containers 26 of "2" operating in the worker node 24 of "node #2" can start in the worker node 24 of "node #1" or "node #3". The details of a determination method are described later.

When the determination unit 46 determines that the container 26 of "$C_i$" cannot start in the worker node 24 storing the container image 28 of "$IM_i$", the node determination unit 47 determines a node to download the container image 28 of "$IM_i$".

For example, in the case of i=2 described above, either worker node 24 of "node #4" or "node #5" is determined as the node to download the container image 28 of "$IM_2$". The details of a determination method are described later.

When the node determination unit 47 determines the node to download the container image 28 of "$IM_i$" in this way, the node determination unit 47 adds the determined node as an arrangement destination node corresponding to "$IM_i$" in the container image arrangement information $G_4$ (FIG. 17).

The download instruction unit 48 is a processing unit that instructs the worker node 24 determined by the node determination unit 47 to download the container image 28 of "$IM_i$". As an example, the download instruction unit 48 periodically instructs each of the arrangement destination nodes in the container image arrangement information $G_4$ (FIG. 17) to download the container image corresponding to each of the arrangement destination nodes. A cycle for outputting the instruction is not particularly limited, but is several seconds to several minutes, for example.

When i=2 is set in FIG. 8, the download instruction unit 48 instructs either worker node 24 of "node #4" or "node #5" to download the container image 28 of "$IM_2$".

Figure 18:
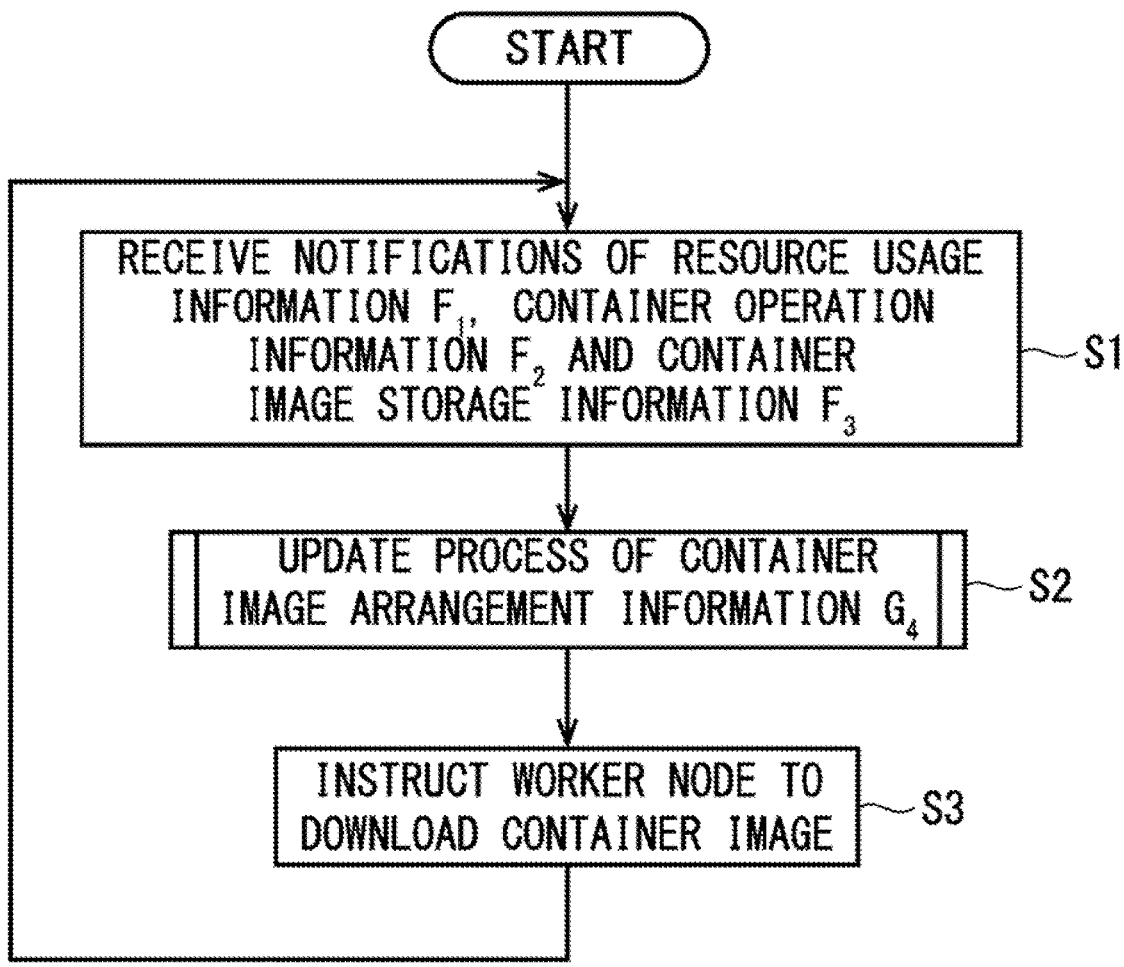
FIG. 18 is a flowchart of a container image arrangement method according to the present embodiment.

Next, a description is given of a container image arrangement method according to the present embodiment. FIG. 18 is a flowchart of the container image arrangement method according to the present embodiment.

First, the communication unit 41 receives notifications of the resource usage information $F_1$, the container operation information $F_2$ and the container image storage information $F_1$ from each worker node 24 (step S1).

Next, the node determination unit 47 performs an update process of the container image arrangement information $G_4$ (step S2). For example, the node determination unit 47 performs the update process of the container image arrangement information $G_4$ by using each of the resource usage information $F_1$, the container operation information $F_2$ and the container image storage information $F_3$. The details of the update process are described later.

Next, the download instruction unit 48 instructs the worker node 24 corresponding to the arrangement destination node of the container image arrangement information $G_4$ to download the container image 28 corresponding to the worker node 24 (step S3).

Thereby, the container image 28 defined in the container image arrangement information $G_4$ is downloaded to the worker node 24 in advance before any of the worker nodes 24 fails. After that, the above-mentioned steps S1 to S3 are repeated at a cycle of several seconds to several tens of minutes.

Next, a description is given of the update process of the container image arrangement information $G_4$ in step S2.

Figure 19:
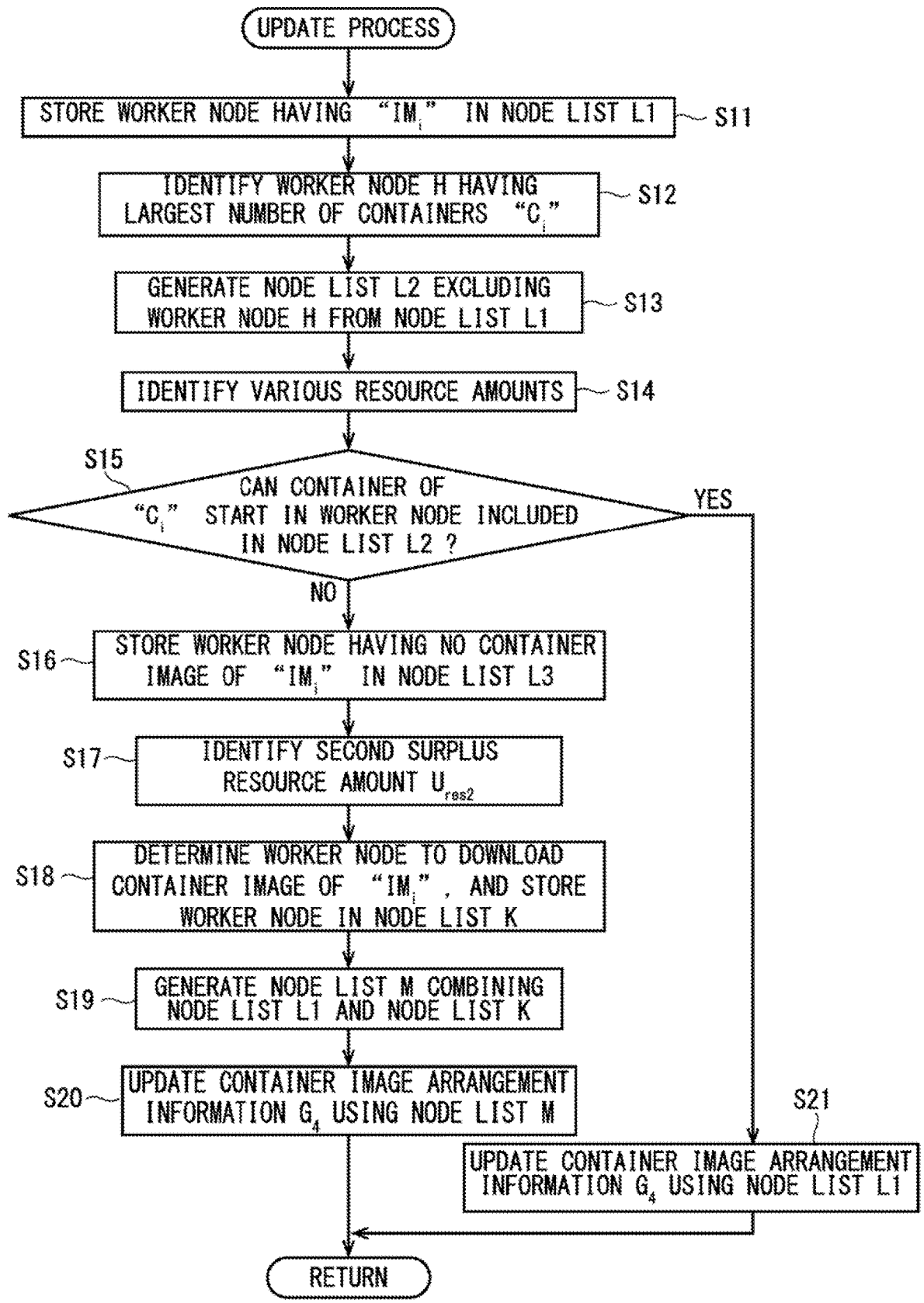
FIG. 19 is a flowchart of an update process of the container image arrangement information according to the present embodiment.

FIG. 19 is a flowchart of the update process of the container image arrangement information $G_4$ according to the present embodiment.

This flowchart can be executed regardless of a value of a subscript i in "$C_i$" and "$IM_i$", but the case of i=2 is described below as an example.

First, the node identification unit 45 identifies the worker node 24 that stores the container image 28 of "IM" with reference to the node-by-node container image storage information $G_3$ (FIG. 16), and stores it in a node list L1 (step S11).

When i=2 is set in FIG. 8, the node list L1 is represented by L1=node #1, node #2, node #31.

Next, the node identification unit 45 identifies the worker node 24 having the largest number of containers 26 of "$C_i$" started from the container image 28 of "$IM_i$" among the worker nodes 24 in the node list L1 (step S12). Hereinafter, the worker node 24 identified in S12 is referred to as a worker node H. The worker node H is an example of a first node. The node identification unit 45 can identify the worker node H by referring to the node-by-node container operation information G2 (FIG. 15).

When i=2 is set in FIG. 15, the worker node 24 having the largest number of containers 26 of "$C_2$" in operation is "node #2", and hence the worker node H is the worker node 24 of "node #2" (H=node #2).

When the worker node H fails, the container 26 of "Ci" operating in the worker node H is anew started in the other worker node 24. Thus, the number of containers 26 of "Ci" anew started in the other worker node when any worker node 24 fails is the largest when the worker node H fails. Therefore, in this embodiment, the case where the worker node H fails is considered as a worst pattern, and in that case, whether the container 26 of "Ci" can start in the other worker node 24 is determined as follows.

Next, the determination unit 46 generates a node list 12 excluding the worker node H from the node list L1 (step S13). In the example of FIG. 8, the node list L2 is represented by L2 {node #1, node #3}.

Since each of the worker nodes 24 included in the node list L2 stores the container 26 of "$IM_i$", it is a candidate node that can start the container 26 of "$C_i$" when the worker node H fails. Each of the worker nodes 24 included in the node list L2 is an example of a second node.

Next, the determination unit 46 identifies various resource amounts as follows (step S14). In the present embodiment, the CPU usage rate is used as the resource amount, but the memory usage amount may be used as the resource amount.

First, the determination unit 46 identifies an average resource amount $U_{ave}$ by averaging amounts of resources used by the container 26 of "$C_i$" by the total number of the containers 26 in operation, with reference to the node-by-node container operation information $G_2$ ((FIG. 15).

The average resource amount $U_{ave}$ is an average value of the amounts of resources used by the container 26 of "C". For example, when the average resource amount $U_{ave}$ is calculated for the container 26 of "$C_2$" in FIG. 15, the average resource amount $U_{ave}$ is 15% (i.e., $U_{ave}$=(30%+60%+15%)/(2+4+1)=15%).

Further, the determination unit 46 identifies a sum resource amount $U_{sum}$ by summing the amounts of resources used by the remaining containers 26 excluding the container 26 of "$C_1$" in the worker node H, with reference to the node-by node container operation information $G_2$ (FIG. 15).

When i=2 is set in FIG. 15, the worker node H is the worker node 24 of "node #2" as described above (H node #2). In the worker node 24 of "node #2", each of the containers 26 of "$C_3$", "$C_4$" and "$C_5$" operates as the container 26 other than "$C_2$". In this case, the sum resource amount $U_{sum}$ is 30% ($U_{sum}$=10%+10%+10%=30%).

The determination unit 46 identifies the amount of resources used by the worker node 24 included in the node list L2, with reference to the node-by-node resource usage information $G_1$ (FIG. 14). Then, the determination unit 46 identifies a first surplus resource amount $U_{res1}$ available by the worker node 24 included in the node list L2 based on the identified resource amount.

The case of L2={node #1, node #3} is considered as described above. In this case, in the example of FIG. 14, a surplus resource of the worker node 24 of "node #1" is 50% (i.e., 100%−50%=50%), and a surplus resource of the worker node 24 of "node #3" is 20% (i.e., 100%−80%=20%). Therefore, the first surplus resource amount $U_{res1}$ is 70% (i.e., $U_{res1}$=50%+20%=70%).

Next, the determination unit 46 determines whether all the containers 26 of "$C_i$" operating in the worker node H can start in the worker node 24 included in the node list L2 (step S15). In order to make this determination, the determination unit 46 calculates a divided value h of the following formula (1).

$$h=(U_{res1}-U_{sum})/U_{ave} \quad (1)$$

When the container 26 other than "$C_i$" in the worker node H is started in the worker node 24 of the node list L2, the "$U_{res1}-U_{sum}$" on the right side of the formula (1) indicates a spare capacity capable of starting the container 26 other than "$C_i$" in the worker node 24. Then, the divided value h represents the number of containers 26 of "C" that can start in the worker node 24 of the node list 12 by dividing the spare capacity by $U_{ave}$.

By subtracting the sum resource amount $U_{sum}$ from the first surplus resource amount $U_{res1}$ in this way, it is possible to obtain the divided value h in assuming a situation in which the container 26 other than "$C_i$" in the worker node H is started in the worker node 24 of the node list L2.

In the above example, the average resource amount $U_{ave}$, the sum resource amount $U_{sum}$ and the first surplus resource amount $U_{res1}$ are 15%, 30% and 70%, respectively ($U_{ave}$=15%, $U_{sum}$=30%, and $U_{res1}$=70%), the divided value h is 2.67 (i.e., h=(70%−30%)/15%=2.67).

Further, the determination unit 46 calculates the number $N_H$ of containers 26 of "$C_i$" operating in the worker node H with reference to the node-by-node container operation information $G_2$ (FIG. 15). In the case of i=2, the worker node H is the worker node 24 of "node #2" (H=node #2) as described above, but in this case, the number $N_H$ is 4 ($N_H$=4) with reference to FIG. 15.

Then, when the divided value h is equal to or more than the number $N_H$, the determination unit 46 determines that all the containers 26 of "$C_i$" can start in the worker node 24 included in the node list L2. When the divided value h is less than the number $N_H$, the determination unit 46 determines that all the containers 26 of "$C_i$" cannot start in the worker node 24 included in the node list L2.

In the above example, the divided value h is less than the number $N_H$ (h=2.67<4=$N_H$). Therefore, the determination unit 46 determines that all four containers 26 of "$C_2$" operating in the worker node of "node #2" cannot start in each of the worker nodes 24 of "node #1" and "node #13" included in the node list L2.

When it is determined that all the containers 26 of "$C_i$" operating in the worker node H cannot start in the worker node 24 included in the node list L2 (step S15: NO), the process proceeds to step S16.

In step S16, the node determination unit 47 identifies the worker node 24 that does not store the container image 28 of "$IM_i$" with reference to the node-by-node container image storage information $G_3$ (see FIG. 16), and stores it in a node list L3. When i=2 is selected in the node-by-node container image storage information $G_3$ in FIG. 16, the worker nodes 24 that do not store the container image of "$IM_2$" are the worker nodes of "node #4" and "node #5", and hence the worker nodes of "node #4" and "node #5" are stored in the node list L3 (i.e., L3=(node #4, node #5)).

Each worker node 24 included in the node list L3 is an example of a fourth node, and is a candidate for the worker node 24 that stores the container image 28 of "$IM_i$" in advance when the worker node H fails.

Next, the node determination unit 47 identifies a second surplus resource amount $U_{res2}$ available by each of the worker nodes 24 included in the node list L3 with reference to the node-by-node resource usage information $G_1$ (FIG. 14) (step S17).

The case of L3 {node #4, node #5} is considered as described above. In this case, the second surplus resource amount $U_{res2}$ in the worker node 24 of "node #4" is 40% (i.e., $U_{res2}$=100%−60%=40%). The second surplus resource amount $U_{res2}$ in the worker node 24 of "node #5" is 30% (i.e., $U_{res2}$=100%−70%=30%).

Next, the node determination unit 47 determines a node to download the container image 28 of "$IM_i$" from the worker nodes 24 included in the node list L3 (step S18).

For example, the node determination unit 47 determines whether the following formula (2) is satisfied for each of the worker nodes 24 included in the node list L3.

$$U_{res2}/U_{ave} \geq N_H-h \quad (2)$$

Here, the average resource amount $U_{ave}$ on the left side of the formula (2) indicates the average resource amount obtained by averaging the amounts of resources used by the container 26 of "$C_i$" as described above. Therefore, "$U_{res2}/U_{ave}$" on the left side of the formula (2) indicates the number of containers 26 of "$C_i$" that can start in the single worker node 24 included in the node list L3.

Then, "$N_H-h$" on the right side of the formula (2) indicates the number of containers 26 that cannot start in the worker node 24 in the node list L2 among the containers 26 of "$C_i$" operating in the worker node H.

Therefore, when the formula (2) is satisfied, the container 26 of "Ci" that cannot start in the worker node 24 in the node list L2 can start in the single worker node 24 included in the node list L3.

Therefore, the node determination unit 47 determines the worker node 24 which satisfies the formula (2) as the node to download the container image 28 of "IMi", and stores it in a node list K. Each worker node 24 included in the node list K is an example of a third node.

For example, the case of L3 (node #4, node #5) is considered as described above. First, the left side of the formula (2) is 1.33 (i.e., $N_H-h$=4−2.67=1.33).

Further, when the left side of the formula (2) is calculated for "node #4", "$U_{res2}/U_{ave}$" is 2.67 (i.e., 40%/15%=2.67), and the formula (2) is satisfied. When the left side of the formula (2) is calculated for "node #5", "$U_{res2}/U_{ave}$" is 2 (i.e., 30%/15%=2), and the formula (2) is also satisfied.

Therefore, in this example, both of "node #4" and "node #5" satisfy the formula (2). Here, the worker node 24 of "node #4" having a larger value on the left side of the formula (2) than that of "node #5" is stored in the node list K. Therefore, the node list K is represented by K=(node #4).

Next, the node determination unit 47 generates a node list M combining the node list L1 and the node list K (step S19). The node list M is a list of the worker node 24 that store the container image 28 of the "IM" in the storage unit 32 (see FIG. 11). When the node list L1 includes node #1, node #2 and node #3 (i.e., L1 (node #1, node #2, node #31), and the node list K includes node #4 (i.e., K={node #4}) as described above, the node list M includes node #1, node #2, node #3 and node 94 (i.e., M={node #1, node #2, node #3, node #4}).

Further, the node determination unit 47 updates the container image arrangement information $G_4$ (FIG. 17) using the node list M (step S20). As an example, the node determination unit 47 updates the arrangement destination node corresponding to the container image 28 of "$IM_i$" in the container image arrangement information $G_4$ to the content of the node list M.

FIG. 20 is a schematic diagram illustrating an example of the container image arrangement information $G_4$ updated by the node determination unit 47 in the case of i=2.

Here, since the node list M includes node #1, node #2, node #3 and node #4 (i.e., M={node #1, node #2, node #3, node #4}) as described above, the arrangement destination nodes corresponding to the container image 28 of "$IM_2$" are updated to the worker nodes 24 of "node #1", "node #2", "node #3" and "node #4".

In step S15, when it is determined that all the containers 26 of "$C_i$" operating in the worker node H can start in the worker node 24 included in the node list L2, the process proceeds to step S21.

In step S21, the node determination unit 47 replaces the arrangement destination node corresponding to the container image 28 of "$IM_1$" in the container image arrangement information $G_4$ (FIG. 17) with the content of the node list L1.

As described above, the node list L1 is a list of the worker node 24 that store the container image 28 of "$IM_i$". Therefore, the arrangement destination node corresponding to the container image 28 of "$IM_i$" in the container image arrangement information $G_4$ (FIG. 17) matches the content of the node list L1. However, if the content of the container image arrangement information $G_4$ is missing for some reason, the missing content can be added by executing step S21.

Thus, the basic steps of the update process of the container image arrangement information $G_4$ according to the present embodiment are completed.

According to the present embodiment, in step S2 (see FIG. 18), the download instruction unit 48 causes each worker node 24 identified by the container image arrangement information $G_4$ to download the container image 28 in advance. For this reason, even if any worker node 24 fails, the other worker node 24 does not need to download the container image 28 for starting the container 26 operating in the failed worker node 24. As a result, even if any worker node 24 fails, the container 26 can start immediately, and the availability of the system 21 can be improved.

Moreover, in step S12, the node identification unit 45 identifies the worker node H. Since the worker node H is the node having the largest number of containers 26 of "$C_i$" in operation among the plurality of worker nodes 24, the worker node H is the worker node 24 having the largest number of containers 26 of "$C_i$" to be migrated to the other worker node in the case of the failure. Since the worker node 24 that stores the container image "$IM_i$" is determined based on the worker node H, even if any worker node 24 having the container 26 of "$C_i$" in operation fails, the container 26 is immediately started in the other worker node 24.

Further, in step S1 (FIG. 18), the communication unit 41 receives the notifications of the resource usage information $F_1$, the container operation information $F_2$ and the container image storage information $F_1$ from each worker node 24. Therefore, the determination unit 46 can calculate each of the average resource amount $U_{ave}$, the sum resource amount $U_{sum}$ and the first surplus resource amount $U_{res1}$ based on the notified information in step S14. Then, the determination unit 46 can determine in step S15 whether all the containers 26 of "$C_i$" operating in the worker node H can start in the worker node 24 included in the node list 12, based on these resource amounts.

Similarly, the node determination unit 47 can calculate the second surplus resource amount $U_{res2}$ based on the resource usage information $F_1$ in step S17.

Then, the node determination unit 47 can determine which of the worker nodes 24 included in the node list L3 downloads the container image 28 based on the second surplus resource amount Ures2 in step S18.

(Hardware Configuration)

Next, a description is given of the hardware configuration of the master node 23 according to the present embodiment.

Figure 21:
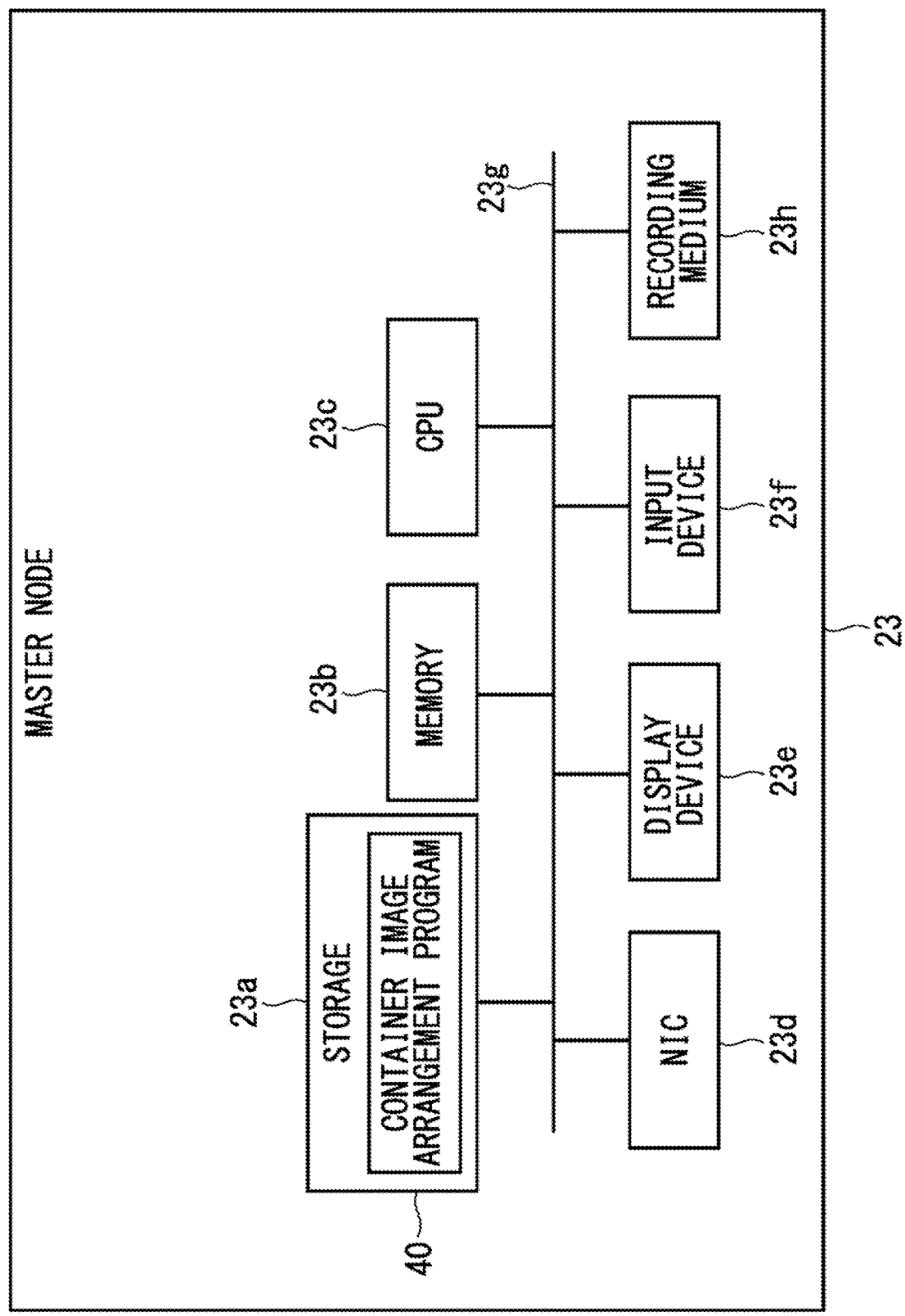

FIG. 21 is a diagram illustrating the hardware configuration of the master node 23 according to the present embodiment.

As illustrated in FIG. 21, the master node 23 includes a storage 23a, a memory 23b, a CPU 23c, a NIC 23d, a display device 23e and an input device 23f. These elements are connected to each other by a bus 23g.

The storage 23a is a non-volatile storage device such as an HDD or an SSD, and stores a container image arrangement program 40 according to the present embodiment.

The container image arrangement program 40 may be recorded on a computer-readable recording medium 23h, and the CPU 23c may read the container image arrangement program 40 from the recording medium 23h.

Examples of such a recording medium 23h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 23h. The recording medium 23h is not a temporary medium such as a carrier wave having no physical form.

Further, the container image arrangement program 40 may be stored in a device connected to a public line, the Internet, a LAN (Local Area Network), or the like. In this case, the CPU 23c may read and execute the container image arrangement program 40.

Meanwhile, the memory 23b is hardware that temporarily stores data, such as a DRAM, and the container image arrangement program 40 is deployed on the memory 23b.

The CPU 23c is a processor that controls each element in the master node 23. Further, the CPU 23c executes the container image arrangement program 40 in cooperation with the memory 23b, which realizes the control unit 43 of FIG. 13.

As illustrated in FIG. 13, the control unit 43 includes the acquisition unit 44, the node identification unit 45, the determination unit 46, the node determination unit 47, and the download instruction unit 48. Further, the storage unit 42 of FIG. 13 is realized by the storage 23a and the memory 23b.

Further, the NIC 30d is a communication interface for connecting the master node 23 to the network 25, and is hardware that realizes the communication unit 41 of FIG. 13.

The display device 23e is hardware such as a liquid crystal display device, and displays various information to an administrator of the system 21. The input device 23f is hardware such as a keyboard and a mouse. For example, the administrator issues various instructions to the master node 23 by operating the input device 23f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A container image arrangement method executed by a processor included in a computer to execute a process, the computer being connected to each of a plurality of nodes, the process comprising:
   identifying, from the plurality of nodes, a first node that has a first storage storing a container image and has a largest number of first containers started from the container image;
   determining whether or not the first containers operating in the first node are capable of starting in second nodes among the plurality of nodes other than the first node, where each of the second nodes has a second storage storing the container image; and
   when it is determined that the first containers are not capable of starting in the second nodes, storing the container image in a third storage included in a third node which is different from each of the first node and the second nodes among the plurality of nodes.

2. The container image arrangement method as claimed in claim 1, the process comprising:
   identifying an average amount of resources obtained by dividing first amounts of resources used by the first containers in both the first node and the second nodes, into a number of first containers in both the first node and the second nodes;
   identifying a sum amount of resources that is a sum of second amounts of resources used by remaining containers excluding the first containers in the first node;
   identifying a surplus amount of resources available in each of the second nodes;
   identifying a first surplus amount of resources available in the second nodes based on the surplus amount of resources; and
   when a first divided value obtained by dividing a difference between the first surplus amount of resources and the sum amount of resources into the average amount of resources is less than the number of first containers operating in the first node, determining that the first containers are incapable of starting in the second nodes.

3. The container image arrangement method as claimed in claim 2, the process comprising:
   receiving first notifications about the first amounts of resources used by the first containers from both the first node and the second nodes that are operating the first containers; and
   identifying the average amount of resources by dividing the first amounts of resources that are included in the first notifications into the number of first containers in both the first node and the second nodes.

4. The container image arrangement method as claimed in claim 2, the process comprising:
   receiving, from the first node, second notifications about second amounts of resources used by remaining containers excluding the first containers in the first node; and
   identifying the sum amount of resources amount by summing the second amounts of resources that are included in the second notifications.

5. The container image arrangement method as claimed in claim 2, the process comprising:
   receiving third notifications about third amounts of resources used by the second nodes from the second nodes, respectively; and
   identifying the first surplus amount of resources based on the third amounts of resources that are included in the third notifications.

6. The container image arrangement method as claimed in claim 2, wherein
   each of the first amounts of resources, the second amounts of resources, and the third amounts of resources is at least one of usage rates of a processor and usage amounts of a memory.

7. The container image arrangement method as claimed in claim 2, the process comprising:
   identifying a second surplus amount of resources available by each of fourth nodes that does not have a fourth storage storing the container image, the fourth nodes being different from the first node and the second node among the plurality of nodes; and
   determining, as the third node, one the fourth nodes in which a second divided value obtained by dividing the second surplus amount of resources by the average amount of resources is equal to or more than a difference between a number of first containers operating in the first node and the first divided value.

8. The container image arrangement method as claimed in claim 7, the process comprising:
   receiving fourth notifications about the container image stored in the plurality of nodes from the plurality of nodes, respectively; and
   identifying one of the fourth nodes based on the fourth notifications, by excluding a fifth node that is other than the first node and the second node storing the container image and in which the second divided value obtained by dividing the second surplus amount of resources into the average amount of resources is less than the difference between the number of first containers operating in the first node and the first divided value.

9. The container image arrangement method as claimed in claim 7, the process comprising:
   receiving fifth notifications about fourth amounts of resources used by the fourth nodes that do not store the container image from the fourth nodes, respectively; and
   identifying the second surplus amount of resources based on the fourth amounts of resources that are included in the fifth notifications.

10. The container image arrangement method as claimed in claim 1, the process comprising:
    receiving a sixth notification about the number of first containers operating in each of the plurality of nodes from each of the plurality of nodes; and identifying the first node having the largest number of containers based on the number of containers included in the sixth notification.

11. A non-transitory computer-readable recording medium storing a program that causes a processor included in a computer to execute a process, the computer being connected to each of a plurality of nodes, the process comprising:

identifying, from the plurality of nodes, a first node that has a first storage storing a container image and has a largest number of first containers started from the container image;

determining whether or not the first containers operating in the first node is capable of starting in second nodes among the plurality of nodes other than the first node, where each of the second nodes has a second storage storing the container image; and when it is determined that the first containers are not capable of starting in the second nodes, storing the container image in a third storage included in a third node which is different from each of the first node and the second nodes among the plurality of nodes.

\* \* \* \* \*